May 31, 1960 — G. W. WALLIN — 2,938,288
SLIDE CARRYING MEANS
Filed April 26, 1956 — 2 Sheets-Sheet 1

Inventor:
Gus W. Wallin
By Robert R. Lockwood
Atty

May 31, 1960
G. W. WALLIN
2,938,288
SLIDE CARRYING MEANS
Filed April 26, 1956
2 Sheets-Sheet 2
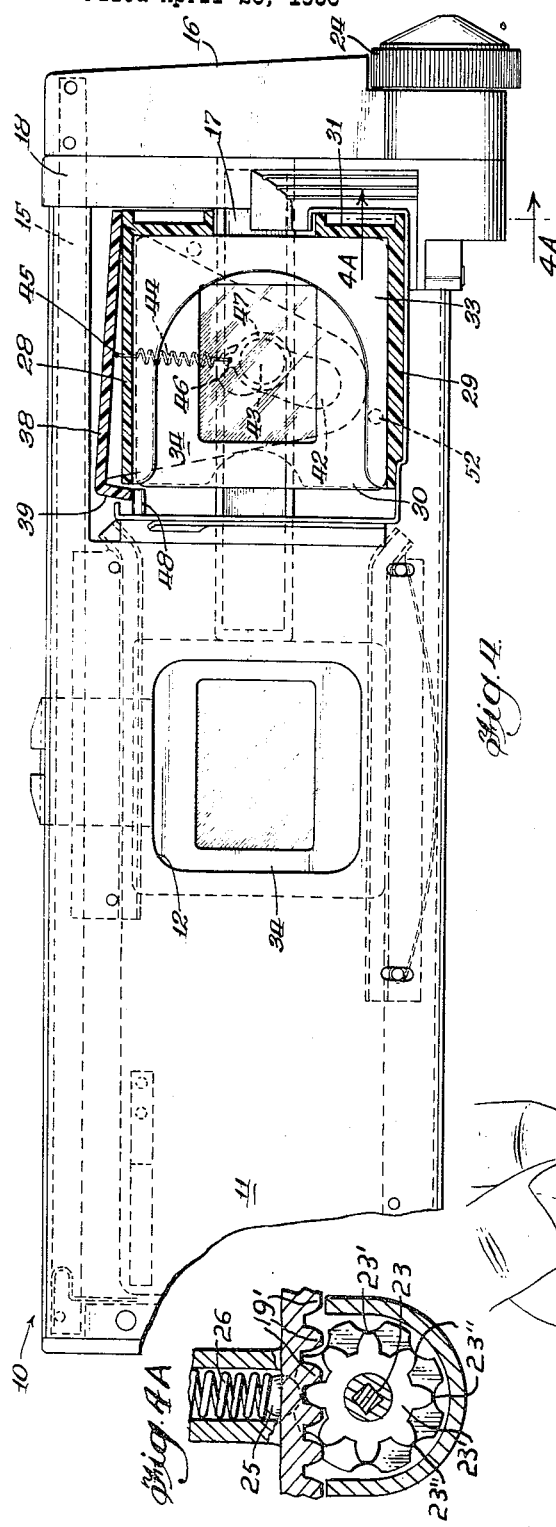

United States Patent Office 2,938,288
Patented May 31, 1960

2,938,288

SLIDE CARRYING MEANS

Gus W. Wallin, Chicago, Ill., assignor to Bell & Howell Company, Chicago, Ill., a corporation of Illinois Filed Apr. 26, 1956, Ser. No. 580,875

21 Claims. (Cl. 40—79)

This invention relates, generally, to stereopticon slide changers and it has particular relation to slide holders. It constitutes an improvement over the slide holder and slide changer construction shown in U.S. Patent No. 2,724,989, issued November 29, 1955.

Among the objects of this invention are: To prevent the accidental removal of slides from a tray carrying the same regardless of the position at which the tray may be placed; to provide for the unhindered removal of slides from a tray when the latter is placed in a slide changer; to permit the unhindered insertion of slides into the tray for initially loading it; to provide a combined cover and slide retaining means for the tray; to limit the opening and closing movement of the cover; to lift the cover when the tray is placed in the slide holder sufficiently to permit the slide retaining means to clear the slides and permit them to be moved from the tray into viewing position and return of the slides to the tray; and to hold the cover in the fully open position for loading the tray.

Other objects of this invention will, in part, be obvious and in part appear hereinafter.

This invention is disclosed in the embodiment thereof shown in the accompanying drawings and it comprises the features of construction, combination of elements and arrangement of parts that will be exemplified in the construction hereinafter set forth and the scope of the application of which will be indicated in the appended claims.

For a more complete understanding of the nature and scope of this invention reference can be had to the following detailed description, taken together with the accompanying drawings, in which:

Figure 4 is a view, partly in side elevation and partly in section, showing the slide changer and the manner in which the tray full of slides is mounted therein with the cover raised to permit slides to be moved out of the tray into viewing position and then back into the tray;

Figure 2:
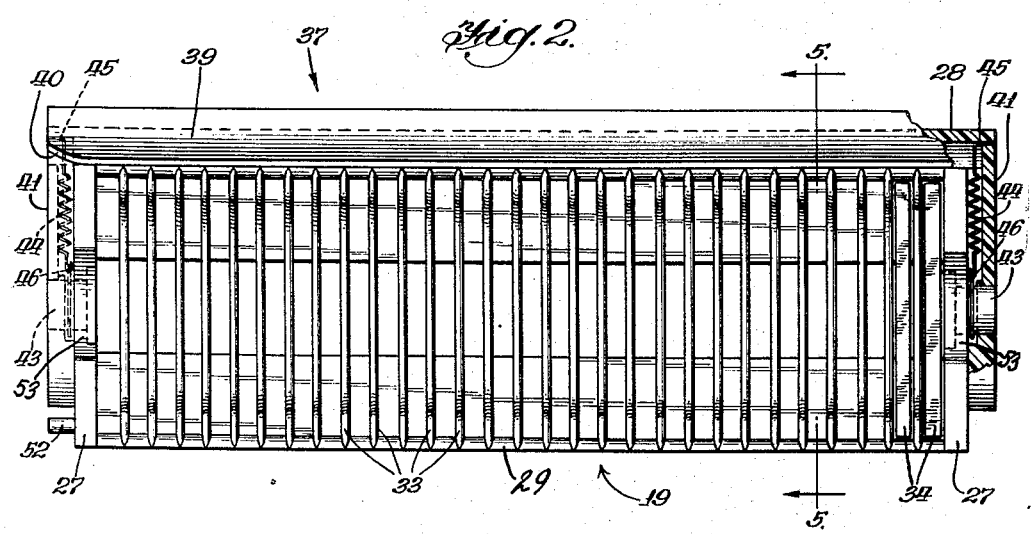
Figure 2 is a view, partly in side elevation and partly in section, of the slide tray showing the cover in the fully open position.

Figure 4–A is a vertical sectional view taken generally along the line 4–A—4–A of Figure 4;

Figure 5 is a view taken generally along the line 5—5 of Figure 2 and showing how the tray can be loaded initially with slides;

Figure 6 is a view, similar to Figure 5, showing the cover in the open position but arranged to prevent the removal of the slides regardless of the position of the tray; and Figure 7 is a view, similar to Figure 5, showing the cover in the fully closed position where it protects the slides.

Figure 1:
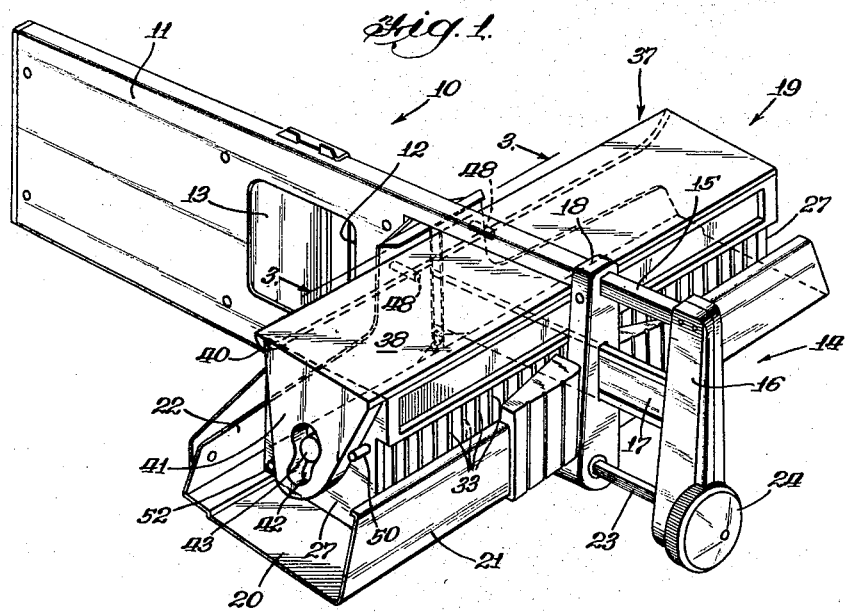
Figure 1 is a perspective view of a slide changer and accompanying slide tray in which the present invention is embodied.

Referring now particularly to Figures 1 and 4 of the drawings, it will be observed that the reference character 10 designates a slide changer which is of the general construction of the slide changer shown in the patent above referred to. Accordingly, only a general description of the slide changer will be given herein with particular reference to the modifications thereof embodying the present invention.

The slide changer 10 includes a frame 11 which is arranged to be mounted in a stereopticon projector and is provided with an aperture 12 through which a light beam is projected for viewing purposes. A shutter 13 is slidably mounted within the frame 11 for closing the aperture 12 in the absence of a slide. The slides are moved into and out of viewing position by means of a yoke, shown generally at 14, which includes a guide arm 15 that is connected by a cross-head 16 to a pusher arm 17. As described more fully in the patent above referred to, the guide arm 15 extends into the frame 11 and is employed, in addition to guiding the yoke 14, to return the shutter 13 to the closed position when a slide is returned from the viewing position. The pusher arm 17 acts on the slides, one by one, to move them into viewing position. The guide arm 15 and the pusher arm 17 extend through an end plate 18 which, together with the frame 11, are employed to slidingly support a tray 19 in a tray holder 20 which is provided with side walls 21 and 22 for guiding the tray 19 therealong. The tray 19 is provided with a longitudinally extending rack 19', Figure 4–A, with which a pinion 23' cooperates to move the tray along the tray holder 20 in order to position the slides one by one in registry with the pusher arm 17. The pinion 23' is carried by a shaft 23 which is rotated by a knob 24 for effecting the movement of the tray 19 as described. The tray 19 is indexed by a ball 25, urged downwardly by a coil compression spring 26, engaging recesses 23" located along the periphery of the pinion 23'.

The details of construction of the tray 19 are shown more clearly in Figures 2 and 5–7 of the drawings. As there shown the tray 19 is formed of a thermosetting material such as a phenolic condensation product by a moulding process. It has ends 27 which serve to interconnect a top wall 28 and a bottom wall 29, Figure 4. Between these walls is an open side 30 with the opposite side 31 partially closed and provided with a longitudinally extending slot 32 through which the pusher arm 17 can project for engaging the slides. This arrangement provides the tray 19 with a generally rectangular cross-section. Formed integrally with the top and bottom walls 28 and 29 and the partially closed side 31 are generally U-shaped septums 33 which serve to hold slides 34 in parallel spaced relation.

Difficulty has been encountered in the past when the tray 19, constructed as described, is positioned in the tray holder 20. It is necessary to place the open side 30 in a vertical location and, if the tray 19 should be tipped slightly so that the open side faces somewhat downwardly, there is a possibility that some or all of the slides 34 may fall out of the tray under the influence of gravity. It is to avoid such accidental removal of the slides from the tray 19 that this invention is particularly addressed.

For this purpose a cover, shown generally at 37, is provided. Preferably it is formed of a transparent plastic such as methylmethacrylate resin although it will be understood that an opaque material can be employed. The cover 37 includes a cover flange 38 which is of sufficient width and length to overlie the open side 30 and the slides 34 in the tray 19 as illustrated in Figure 7.

Figure 3:
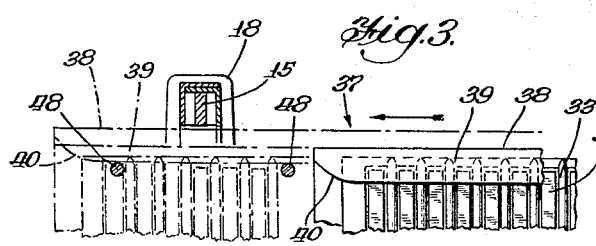
Figure 3 is a fractional sectional view taken generally along the line 3—3 of Figure 1 and showing how the cover is automatically raised when the tray is placed in the slide changer and moved therealong.

Formed integrally with the cover flange 38 and depending from one side is a lip 39 which is provided with upturned ends 40, Figure 3, to facilitate lifting of the cover 37 when the tray 19 is placed on the tray holder 20 as will be described hereinafter.

The cover 37 is rockably and slidably mounted on the ends 27 of the tray 19. For this purpose ears 41 are formed, preferably integrally, with the cover flange 38 at its ends and they overlie the ends 27. The ears 41 are provided with angularly shaped slots 42 through which trunnions 43 project, the trunnions 43 being mounted centrally of the ends 27 and projecting laterally outwardly therefrom as shown more clearly in Figure 1 of the drawings.

With a view to biasing the cover 37 toward the tray 19 coil tension springs 44 are employed. As shown more clearly in Figure 4 of the drawings the springs 44 are secured at their upper ends at 45 to the cover 37, centrally of the cover flange 38, and at 46 to a retaining ring 47 which surrounds the respective trunnion 43. By means of these springs 44 the cover 37 is biased toward the tray 19 in any position that it may assume. This will be clear from a consideration of Figures 5–7.

The tray 19 is positioned on the tray holder 20 with the cover 37 in the position shown in Figure 6 where the lip 39 extends over portions of the slides 34 sufficiently to prevent the removal thereof from the tray 19. In order to lift the lip 39 and the cover 37 so that the former clears the slides 34, detents 48 are provided as shown more clearly in Figures 1 and 3 of the drawings on the side wall 22 of the tray holder 20 so that regardless of the direction in which the tray 19 is applied, one or the other of the upturned ends 40 of the lip 39 will engage one or the other of the detents 48. As the tray 19 is moved along the tray holder 20 on rotation of the knob 24, the lip 39 will be raised, as shown in Figures 3 and 4 of the drawings, so that the pusher arm 17 can move the slide 34 in registry therewith out of the tray 19 and into viewing position in the aperture 12. As the tray 19 moves out of the tray holder 20, the lip 39 no longer is held in the elevated position and the springs 44 urge the cover 37 downwardly to the position shown in Figure 6 so that, when the tray 19 is removed from the tray holder 20, the slides 34 are prevented from accidentally being discharged from the tray regardless of the position in which it may be placed.

It is desirable to hold the cover 37 in a position as shown in Figure 5 beyond the open position shown in Figure 6 to permit loading of the slides 34 into the tray 19. For this purpose the edge of the top 28 provides a shoulder 49 which, as here shown, is engaged by the lip 39 to hold the cover 37 in this position where it does not interfere with the application of the slides 34. The movement of the cover 37 in the full open position is limited by a stop pin 50 which extends laterally outwardly from the end 27. It will be understood that two stop pins 50 can be employed if desired and that they cooperate with the slots 42 and the trunnions 43 in limiting the movement of the cover 37 to the full open position.

A recess 51 is provided along the edge of the bottom 29 for receiving the lip 39 of the cover 37 in the closed position as shown in Figure 7. In order to prevent movement of the cover 37 beyond the fully closed position a stop pin 52 is provided in the end 27. Two stop pins 52 can be employed if desired. It will be understood that the stop pin 52 cooperates with the slots 42 and trunnions 43 to limit the movement of the cover 37 in the fully closed position.

In operation, the tray 19 is loaded, as illustrated in Figure 5, by moving the cover 37 to the position shown in Figure 5 where the lip 39 bears against the shoulder 49 and the ears bear against the stop pins 50. If the slides 34 are to be retained without showing in the tray 19, the cover 37 is swung to the fully closed position shown in Figure 7. Here the ears engage the stop pins 52 and, in cooperation with the springs 44 and the trunnions 43 in the slots 42, the cover 37 is held closed.

Now, when it is desired to place the loaded tray 19 in the tray holder 20, the cover 37 is swung to the position shown in Figure 6 of the drawings. The ears 41 may engage the stop pin 50 while the inner side of the lip 39 engages the shoulder 49 with the lip 39 overlying portions of the slides 34 and preventing their discharge from the tray 19 even though the cover 37 is in the open position. Next the tray 19, with the cover 37 positioned as shown in Figure 6, is turned through 90° so that the open side 30 faces the aperture 12 in the slide changer 10. As the tray 19 is moved along the tray holder 20, one of the upturned ends 40 of the lip 39 engages one of the detents 48 on the side wall 22 of the slide changer 10. This results in the cover 37 being lifted to the fully open position as shown in Figure 4 where the pusher arm 17 can be moved to shift the slides, one by one, into the viewing position. After all of the slides have been shown, the tray 19 is moved out of the tray holder 20 and the springs 44 automatically move the cover 37 back to the open position, shown in Figure 6, as the trailing upturned end 40 moves out of engagement with the respective detent 48. After the tray 19 is removed from the tray holder 20, the cover 37 is swung to the fully closed position as shown in Figure 7.

While the lip 39 has been illustrated and described as being a rigid member and constituting an integral extension of the cover flange 38, it will be understood that it can be a separate member attached to the cover flange 38. Also, it will be understood that it could be a flexible member with the detents 48 arranged to lift only that portion necessary to permit the movement of a slide out of the tray 19 into viewing position and return.

The ends 27 are recessed, as indicated at 53 in Figures 2, 5 and 6, to facilitate removal of the slide 34 adjacent thereto.

Since certain further changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. Means for supporting slides and transporting the same to and from viewing position comprising, in combination; an elongated tray having a rectangular cross-section, open at one side, partially open at the opposite side, and having means to hold slides in spaced relation for movement from and to the tray through said one side; a cover for said open side of said tray overlying said slides therein and rockably and slidably mounted on the ends thereof to move from a position in registry with said open side to an open position along a side at right angles to said open side, spring means interconnecting said cover and said tray and biasing the former toward the latter, a lip extending laterally from said cover and overlying portions of said slides to prevent removal thereof from said tray when said cover is in said open position, and means for receiving said tray with said cover in said open position having means cooperable with said lip to raise the same sufficiently to clear said slides and means for indexing said tray while said lip is held in raised position.

2. Means for supporting slides and transporting the same to and from viewing position comprising, in combination; an elongated tray having a rectangular cross-section, open at one side, partially open at the opposite side, and having means to hold slides in spaced relation for movement from and to the tray through said one side; a cover for said open side of said tray overlying said slides therein and rockably and slidably mounted on the ends thereof to move from a position in registry with said open side to an open position along a side at right angles to said open side, spring means interconnecting said cover and said tray and biasing the former toward the latter, a lip extending laterally from said cover and overlying portions of said slides to prevent removal therefrom from said tray when said cover is in said open position, means for receiving said tray with said cover in said open position having means cooperable with said lip to raise the same sufficiently to clear at least the slide to be shown and means for indexing said tray while said lip is held in raised position, and stop means on said tray cooperating with said cover to limit the opening and closing movement thereof.

3. Means for supporting slides and transporting the same to and from viewing position comprising, in combination; an elongated tray having a rectangular cross-section, open at one side, partially open at the opposite side, and having means to hold slides in spaced relation for movement from and to the tray through said one side; a cover for said open side of said tray overlying said slides therein and rockably and slidably mounted on the ends thereof to move from a position in registry with said open side to an open position along a side at right angles to said open side, spring means interconnecting said cover and said tray and biasing the former toward the latter, a lip extending laterally from said cover and overlying portions of said slides to prevent removal thereof from said tray when said cover is in said open position, means for receiving said tray with said cover in said open position having means cooperable with said lip to raise the same sufficiently to clear at least the slide to be shown and means for indexing said tray while said lip is held in raised position, stop means on said tray cooperating with said cover to limit the opening and closing movement thereof, and means on said tray for holding said lip in raised position against the biasing action of said spring means to permit loading slides into said tray.

4. Means for supporting slides and transporting the same to and from viewing position comprising, in combination; an elongated tray having a rectangular cross-section, open at one side, partially open at the opposite side, and having a plurality of septums to hold slides in spaced relation for movement from and to the tray through said one side; trunnions on the ends of said tray; a cover for said open side of said tray above said slides therein, said cover having ears at the ends overlying said ends of said tray, and provided with elongated slots guided on said trunnions whereby said cover is movable from a position in registry with said open side to an open position along a side at right angles to said open side; spring means interconnecting said cover and said tray and biasing the former toward the latter, a lip extending laterally from said cover and overlying portions of said slides to prevent removal thereof from said tray when said cover is in said open position, and means for receiving said tray with said cover in said open position having means cooperable with said lip to raise the same sufficiently to clear at least the slide to be shown and means for indexing said tray while said lip is held in raised position.

5. Means for supporting slides and transporting the same to and from viewing position comprising, in combination; an elongated tray having a rectangular cross-section, open at one side, partially open at the opposite side, and having a plurality of septums to hold slides in spaced relation for movement from and to the tray through said one side; trunnions on the ends of said tray; a cover for said open side of said tray above said slides therein, said cover having ears at the ends overlying said ends of said tray, and provided with elongated slots guided on said trunnions whereby said cover is movable from a position in registry with said open side to an open position along a side at right angles to said open side; spring means interconnecting said cover and said tray and biasing the former toward the latter, a lip extending laterally from one edge of said cover and overlying portions of said slides to prevent removal thereof from said tray when said cover is in said open position, means for receiving said tray with said cover in said open position having detent means engageable by said lip to raise the same sufficiently to clear said slides and means for indexing said tray while said lip is held in raised position, and stop means on said tray cooperating with the slots in said ears to limit the opening and closing movement of said cover.

6. Means for supporting slides and transporting the same to and from viewing position comprising, in combination; an elongated tray having a rectangular cross-section, open at one side, partially open at the opposite side, and having a plurality of septums to hold slides in spaced relation for movement from and to the tray through said one side; trunnions on the ends of said tray; a cover for said open side of said tray above said slides therein, said cover having ears at the ends overlying said ends of said tray, and provided with elongated slots guided on said trunnions whereby said cover is movable from a position in registry with said open side to an open position along a side at right angles to said open side; spring means interconnecting said cover and said tray and biasing the former toward the latter, a lip extending laterally from one edge of said cover and overlying portions of said slides to prevent removal thereof from said tray when said cover is in said open position, means for receiving said tray with said cover in said open position having detent means engageable by said lip to raise the same sufficiently to clear said slides and means for indexing said tray while said lip is held in raised position, stop means on said tray cooperating with the slots in said ears to limit the opening and closing movement of said cover, and means on said tray cooperating with said lip in raised position to hold it in such position against the biasing action of said spring means to permit loading of slides into said tray.

7. Means for supporting slides and transporting the same to and from viewing position comprising, in combination; an elongated tray having a rectangular cross-section, open at one side, partially open at the opposite side, and having a plurality of septums to hold slides in spaced relation for movement from and to the tray through said one side; trunnions extending outwardly centrally from the ends of said tray; a cover for said open side of said tray above said slides therein, said cover having ears at the ends overlying said ends of said tray, and provided with elongated slots guided on said trunnions whereby said cover is movable from a position in registry with said open side to an open position along a side at right angles to said open side; a coil tension spring interconnecting each end of said cover and the respective end of said tray and biasing said cover toward said tray, a lip provided with upturned ends depending from one edge of said cover and overlying portions of said slides to prevent removal thereof from said tray when said cover is in said open position, means for receiving said tray with said cover in said open position having detent means engageable by said lip at one of its upturned ends to raise said cover sufficiently to clear said slides and means for indexing said tray while said lip is held in raised position, stop means on one end of said tray cooperating with the slot in the ear of said cover thereat to limit the opening movement of said cover, and stop means on one end of said tray cooperating with the slot in the ear of said cover thereat to limit the closing movement of said cover.

8. Means for supporting slides and transporting the same to and from viewing position comprising, in combination; an elongated tray having a rectangular cross-section, open at one side, partially open at the opposite side, and having a plurality of septums to hold slides in spaced relation for movement from and to the tray through said one side; trunnions extending outwardly centrally from the ends of said tray; a cover for said open side of said tray above said slides therein, said cover having ears at the ends overlying said ends of said tray, and provided with elongated slots guided on said trunnions whereby said cover is movable from a position in registry with said open side to an open position along a side at right angles to said open side; a coil tension spring interconnecting each end of said cover and the respective end of said tray and biasing said cover toward said tray, a lip provided with upturned ends depending from one edge of said cover and overlying portions of said slides to prevent removal thereof from said tray when said cover is in said open position, means for receiving said tray with said cover in said open position having detent means engageable by said lip at one of its upturned ends to raise said cover sufficiently to clear said slides and means for indexing said tray while said lip is held in raised position, stop means on one end of said tray cooperating with the slot in the ear of said cover thereat to limit the opening movement of said cover, stop means on one end of said tray cooperating with the slot in the ear of said cover thereat to limit the closing movement of said cover, and the ends of said tray having shoulders cooperating with said lip to hold it out of overlying position with respect to said slides against the biasing action of said springs to permit loading of slides into said tray.

9. A slide holding tray for insertion in a slide changer of a projector comprising, in combination; an elongated tray having a rectangular cross-section, open at one side, and having means to hold slides in spaced relation for movement from and to the tray through said one side; a cover for said open side of said tray overlying slides therein and rockably and slidably mounted on the ends thereof to move from a position in registry with said open side to an open position along a side at right angles to said open side, spring means interconnecting said cover and said tray and biasing the former toward the latter, and a lip extending laterally from said cover and overlying portions of said slides to prevent removal thereof from said tray when said cover is in said open position.

10. A slide holding tray for insertion in a slide changer of a projector comprising, in combination; an elongated tray having a rectangular cross-section, open at one side, and having means to hold slides in spaced relation for movement from and to the tray through said one side; a cover for said open side of said tray overlying slides therein and rockably and slidably mounted on the ends thereof to move from a position in registry with said open side to an open position along a side at right angles to said open side, spring means interconnecting said cover and said tray and biasing the former toward the latter, a lip extending laterally from said cover and overlying portions of said slides to prevent removal thereof from said tray when said cover is in said open position, and means on said tray for holding said lip out of overlying position with respect to said slides against the biasing action of said spring means to permit loading slides into said tray.

11. A slide holding tray for insertion in a slide changer of a projector comprising, in combination; an elongated tray having a rectangular cross-section, open at one side, partially open at the opposite side, and having a plurality of septums to hold slides in spaced relation for movement from and to the tray through said one side; trunnions extending outwardly centrally from the ends of said tray; a cover for said open side of said tray overlying slides therein, having ears at the ends overlying said ends of said tray, and provided with elongated slots guided on said trunnions whereby said cover is movable from a position in registry with said open side to an open position along a side at right angles to said open side; spring means interconnecting said cover and said tray and biasing the former toward the latter, and a lip extending laterally from said cover and overlying portions of said slides to prevent removal thereof from said tray when said cover is in said open position.

12. A slide holding tray for insertion in a slide changer of a projector comprising, in combination; an elongated tray having a rectangular cross-section, open at one side, partially open at the opposite side, and having a plurality of septums to hold slides in spaced relation for movement from and to the tray through said one side; trunnions extending outwardly centrally from the ends of said tray; a cover for said open side of said tray overlying slides therein, having ears at the ends overlying said ends of said tray, and provided with elongated slots guided on said trunnions whereby said cover is movable from a position in registry with said open side to an open position along a side at right angles to said open side; spring means interconnecting said cover and said tray and biasing the former toward the latter, a lip extending laterally from said cover and overlying portions of said slides to prevent removal thereof from said tray when said cover is in said open position, and means on said tray cooperating with said lip to hold it out of overlying position with respect to said slides against the biasing action of said spring means to permit loading of slides into said tray.

13. A slide holding tray for insertion in a slide changer of a projector comprising, in combination; an elongated tray having a rectangular cross-section, open at one side, partially open at the opposite side, and having a plurality of septums to hold slides in spaced relation for movement from and to the tray through said one side; trunnions extending outwardly centrally from the ends of said tray; a cover for said open side of said tray overlying slides therein, having ears at the ends overlying said ends of said tray, and provided with elongated slots guided on said trunnions whereby said cover is movable from a position in registry with said open side to an open position along a side at right angles to said open side; spring means interconnecting said cover and said tray and biasing the former toward the latter, a lip extending laterally from one edge of said cover and overlying portions of said slides to prevent removal thereof from said tray when said cover is in said open position, and stop means on said tray cooperating with said slots to limit the opening and closing movement of said cover.

14. A slide holding tray for insertion in a slide changer of a projector comprising, in combination; an elongated tray having a rectangular cross-section, open at one side, partially open at the opposite side, and having a plurality of septums to hold slides in spaced relation for movement from and to the tray through said one side; trunnions extending outwardly centrally from the ends of said tray; a cover for said open side of said tray overlying slides therein, having ears at the ends overlying said ends of said tray, and provided with elongated slots guided on said trunnions whereby said cover is movable from a position in registry with said open side to an open position along a side at right angles to said open side; spring means interconnecting said cover and said tray and biasing the former toward the latter, a lip extending laterally from one edge of said cover and overlying portions of said slides to prevent removal thereof from said tray when said cover is in said open position, stop means on said tray cooperating with said slots to limit the opening and closing movement of said cover, and the ends of said tray having shoulders cooperating with said lip to hold it out of overlying position with respect to said slides against the biasing action of said spring means to permit loading of slides into said tray.

15. A slide holding tray for insertion in a slide changer of a projector comprising, in combination; an elongated tray having a rectangular cross-section, open at one side, partially open at the opposite side, and having a plurality of septums to hold slides in spaced relation for movement from and to the tray through said one side; trunnions extending outwardly centrally from the ends of said tray; a cover for said open side of said tray overlying said ends of said tray, and provided with elongated slots guided on said trunnions whereby said cover is movable from a position in registry with said open side to an open position along a side at right angles to said open side; spring means interconnecting said cover and said tray and biasing the former toward the latter, a lip extending laterally from one edge of said cover and overlying portions of said slides to prevent removal thereof from said tray when said cover is in said open position, stop means on one end of said tray cooperating with the slot in the ear of said cover thereat to limit the opening movement of said cover, and stop means on one end of said tray cooperating with the slot in the ear of said cover thereat to limit the closing movement of said cover.

16. A slide holding tray for for insertion in a slide changer of a projector comprising, in combination; an elongated tray having a rectangular cross-section, open at one side, partially open at the opposite side, and having a plurality of septums to hold slides in spaced relation for movement from and to the tray through said one side; trunnions extending outwardly centrally from the ends of said tray; a cover for said open side of said tray overlying slides therein, having ears at the ends overlying said ends of said tray, and provided with elongated slots guided on said trunnions whereby said cover is movable from a position in registry with said open side to an open position along a side at right angles to said open side; a coil tension spring interconnecting each end of said cover and the respective end of said tray and biasing said cover toward said tray, a lip extending laterally from one edge of said cover and overlying portions of said slides to prevent removal thereof from said tray when said cover is in said open position, and the ends of said tray having shoulders cooperating with said lip to hold it out of overlying position with respect to said slides against the biasing action of said springs to permit loading of slides into said tray.

17. A slide holding tray for insertion in a slide changer of a projector comprising, in combination; an elongated tray having a rectangular cross-section, open at one side, partially open at the opposite side, and having a plurality of septums to hold slides in spaced relation for movement from and to the tray through said one side; trunnions extending outwardly centrally from the ends of said tray; a cover for said open side of said tray overlying slides therein, having ears at the ends overlying said ends of said tray, and provided with elongated slots guided on said trunnions whereby said cover is movable from a position in registry with said open side to an open position along a side at right angles to said open side; a coil tension spring interconnecting each end of said cover and the respective end of said tray and biasing said cover toward said tray, a lip extending laterally from one edge of said cover and overlying portions of said slides to prevent removal thereof from said tray when said cover is in said open position, stop means on one end of said tray cooperating with the slot in the ear of said cover thereat to limit the opening movement of said cover, stop means on one end of said tray cooperating with the slot in the ear of said cover thereat to limit the closing movement of said cover, and the ends of said tray having shoulders cooperating with said lip to hold it out of overlying position with respect to said slides against the biasing action of said springs to permit loading of slides into said tray.

18. Means for supporting slides and transporting the same to and from viewing position comprising, in combination; an elongated tray having a rectangular cross-section, open at one side, partially open at the opposite side, and having means to hold slides in spaced relation for movement from and to the tray through said one side; slide retaining means mounted on said tray for movement into and out of retaining position overlying portions of said slides in said tray to prevent removal of said slides, spring means biasing said retaining means into said position, means for receiving said tray having means cooperating with said retaining means on insertion of said tray to move said retaining means out of said slide retaining position, and means for indexing said tray while said retaining means is held out of said slide retaining position.

19. Means for supporting slides and transporting the same to and from viewing position comprising, in combination; an elongated tray having a rectangular cross-section, open at one side, partially open at the opposite side, and having means to hold slides in spaced relation for movement from and to the tray through said one side; a slide retaining lip extending longitudinally of said tray and mounted for transverse movement into and out of retaining position overlying portions of said slides in said tray to prevent removal of said slides, spring means biasing said slide retaining lip into said position, and means for receiving said tray and having means cooperable with said lip transversely thereof to move the same out of said retaining position to clear said slides, and means for indexing said tray while said lip is held out of slide retaining position.

20. A slide carrying tray comprising, in combination; an elongated tray having a rectangular cross section, open at one side, and having means to hold slides in spaced relation for movement from and to the tray through said one side; and slide retaining means mounted on said tray for movement into and out of retaining position overlying portions of slides in said tray to prevent removal of said slides, spring means biasing said retaining means into said position, said retaining means being engageable with a cooperating part of a slide changing means on which said tray is mounted to position said retaining means out of said retaining position.

21. A slide carrying tray comprising, in combination; an elongated tray having a rectangular cross-section, open at one side, and having means to hold slides in spaced relation for movement from and to the tray through said side; and a slide retaining lip extending longitudinally of said tray and mounted thereon for transverse movement into and out of retaining position overlying portions of said slides in said tray to prevent removal of said slides, spring means biasing said retaining means into said position, said lip having a longitudinally extending surface slidably engageable with a relatively stationary cooperating part of a slide changing means on which said tray is mounted for longitudinal movement to position said lip out of said retaining position.

References Cited in the file of this patent
UNITED STATES PATENTS

| | | |
|---|---|---|
| 608,164 | Brun | Dec. 27, 1934 |
| 2,711,602 | Wiklund | June 28, 1955 |
| 2,724,989 | Badalich | Nov. 29, 1955 |
| 2,774,472 | Badalich | Dec. 18, 1956 |

Disclaimer 2,938,288.—*Gus W. Wallin*, Chicago, Ill. SLIDE CARRYING MEANS. Patent dated May 31, 1960. Disclaimer filed July 2, 1963, by the assignee, *Argus Incorporated*.

Hereby enters this disclaimer to claims 18, 19, 20 and 21 of said patent.

[*Official Gazette October 8, 1963.*]